(12) United States Patent
Baek et al.

(10) Patent No.: US 11,954,644 B2
(45) Date of Patent: *Apr. 9, 2024

(54) ELECTRONIC APPARATUS FOR PROVIDING PICKING INFORMATION OF ITEM AND METHOD THEREOF

(71) Applicant: Coupang Corp., Seoul (KR)

(72) Inventors: Hyeon Chang Baek, Seoul (KR); Chang Hyun Kim, Seoul (KR); Sang Ho Yim, Seoul (KR); Sung Jin Park, Seoul (KR); Chang Geun Jin, Seoul (KR); Lianxi Bai, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,595

(22) Filed: Jul. 1, 2021

(65) Prior Publication Data

US 2022/0044195 A1 Feb. 10, 2022

Related U.S. Application Data

(63) Continuation of application No. 17/016,132, filed on Sep. 9, 2020, now Pat. No. 11,113,662.

(30) Foreign Application Priority Data

Aug. 6, 2020 (KR) ................. 10-2020-0098789

(51) Int. Cl.
*G06Q 10/0875* (2023.01)
*G06Q 50/28* (2012.01)

(52) U.S. Cl.
CPC ......... *G06Q 10/0875* (2013.01); *G06Q 50/28* (2013.01)

(58) Field of Classification Search
CPC ............................ G06Q 10/0875; G06Q 50/28
See application file for complete search history.

(56) References Cited

U.S. PATENT DOCUMENTS

| 5,379,229 A | 1/1995 | Parsons et al. |
| 8,458,014 B2 | 6/2013 | Cheng et al. |

(Continued)

FOREIGN PATENT DOCUMENTS

| CN | 108550072 A | 9/2018 |
| CN | 110472900 A | 11/2019 |

(Continued)

OTHER PUBLICATIONS

Edwards, "Wagner Logistics implements inVia Robotics software in its Kansas warehouse", Jan. 2020, https://roboticsandautomationnews.com/2020/01/22/wagner-logistics-implements-invia-robotics-software-in-its-kansas-warehouse/28906/ (Year: 2020).*

(Continued)

*Primary Examiner* — Allen C Chein
(74) *Attorney, Agent, or Firm* — Banner & Witcoff, Ltd.

(57) ABSTRACT

Provided is an electronic apparatus and a method thereof. The method includes identifying pickup item information, identifying at least one storage place corresponding to the pickup item information among a plurality of storage places in the item storage center based on information on or regarding an item group located at each of the plurality of storage places, and providing information on the identified storage place and the pickup item information to a manager terminal, wherein the item group comprises at least one same item corresponding to an item group, and at least a portion of a plurality of item groups comprising a same item are stored in different storage places in the item storage center.

12 Claims, 8 Drawing Sheets

(56) References Cited

U.S. PATENT DOCUMENTS

| | | | |
|---|---|---|---|
| 8,566,181 B2 | 10/2013 | Narayanan et al. | |
| 11,760,569 B2 | 9/2023 | Lert | |
| 2013/0317642 A1* | 11/2013 | Asaria | G06Q 10/08 700/216 |
| 2014/0351101 A1* | 11/2014 | Danelski | G06Q 30/06 705/28 |
| 2016/0019633 A1* | 1/2016 | Waddington | G06Q 20/203 705/26.81 |
| 2016/0048905 A1 | 2/2016 | Yuan | |
| 2016/0232192 A1* | 8/2016 | Shimanovsky | G06F 16/285 |
| 2019/0367276 A1 | 12/2019 | Yoshitake et al. | |
| 2022/0289485 A1* | 9/2022 | Gröessl | B65G 1/1373 |

FOREIGN PATENT DOCUMENTS

| | | |
|---|---|---|
| CN | 110717697 A | 1/2020 |
| CN | 111292030 A | 6/2020 |
| JP | H09048508 A | 2/1997 |
| JP | H10017118 A | 1/1998 |
| JP | 2000034004 A | 2/2000 |
| JP | 3304789 B2 | 7/2002 |
| JP | 2003081432 A | 3/2003 |
| JP | 2005324945 A | 11/2005 |
| JP | 2005330020 A | 12/2005 |
| JP | 2007102396 A | 4/2007 |
| JP | 2008239337 A | 10/2008 |
| JP | 2016192120 A | 11/2016 |
| JP | 6296003 B2 | 3/2018 |
| JP | 2019206415 A | 12/2019 |
| KR | 1020160001579 A | 1/2016 |
| KR | 10-2016-0059583 A | 5/2016 |
| KR | 101847194 B1 | 4/2018 |
| KR | 1020200018950 | 2/2020 |
| TW | I553567 B | 10/2016 |
| TW | I588071 B | 6/2017 |

OTHER PUBLICATIONS

Aug. 20, 2021—HK—Office Action Appl. No. 22020018493.9, English Translation.

* cited by examiner

FIG. 7
701
① Take one tote and cart!
See tote/cart image
② Scan barcode on tote!
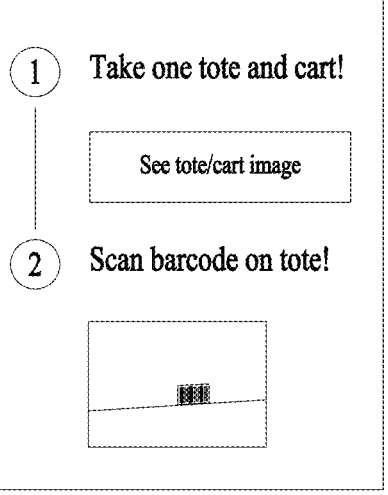
702
Scan location barcode.
| 21J924 | 1 | 101 | ⓘ |
(Item name) Powdered formula, stage 3
(Qty.) 5
703
| 21J924 | 1 | 101 | 5 |
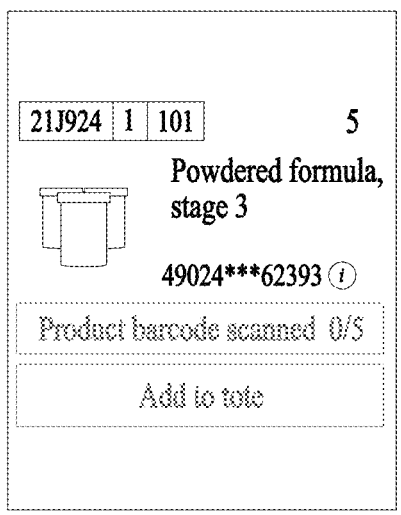
Powdered formula, stage 3
49024***62393 ⓘ
Product barcode scanned 0/5
Add to tote
704
| 21J924 | 1 | 101 | 5 |
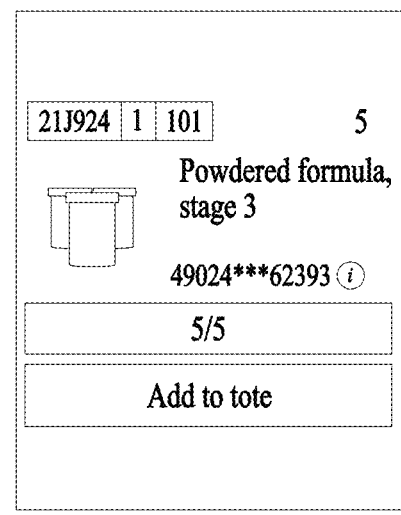
Powdered formula, stage 3
49024***62393 ⓘ
5/5
Add to tote

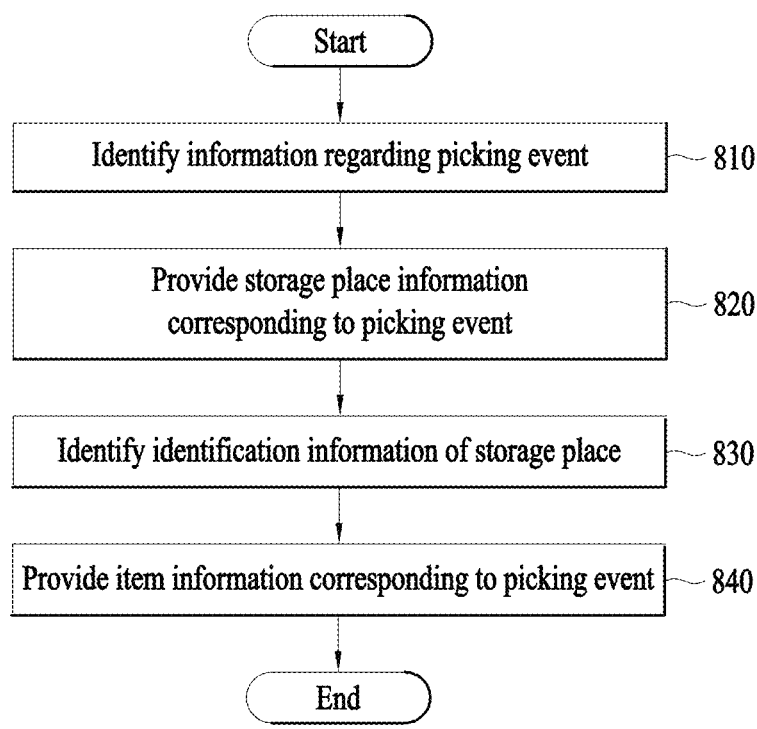

ELECTRONIC APPARATUS FOR PROVIDING PICKING INFORMATION OF ITEM AND METHOD THEREOF

BACKGROUND

This application is a continuation of U.S. application Ser. No. 17/016,132 filed on Sep. 9, 2020, which claims the benefit of Korean Application No. 10-2020-0098789, filed Aug. 6, 2020. The present application claims priority to and the benefit of the above-identified applications and patents and the above-identified applications and patents are incorporated by reference herein in their entirety.

TECHNICAL FIELD

This disclosure relates to an electronic apparatus for providing information, to a manager terminal, for shipping an item in from item storage center and a method thereof.

DESCRIPTION OF THE RELATED ART

An item storage center is a facility that stores items (or products) temporarily or for a long time before delivering the items to customers who ordered the items. As e-commerce is actively used, the need for the item storage center is increasing. Furthermore, there is an increasing demand for more effective use of the item storage center and quick delivery.

Recently, in response to this demand, a random stow-based item arranging (or displaying) method has been introduced for the item storage center. The random stow method is a method for arranging items such that the same item is randomly distributed in several locations. In a case in which the item is arranged in the random stow method, an item in a location more suitable for a manager among locations in which the same item is placed may be picked when shipping the item, which may lead to a maximized work efficiency of the item storage center.

However, if the random stow method is used, the same items may be distributed in several locations and thus, the picking may be performed for each item group related to the item placement. When the picking is performed in response to a request for shipment of a plurality of specific items, and when the plurality of specific items belongs to different item groups even if they are actually located in the same storage place, the picking may be performed multiple times as if the plurality of specific items are placed in different locations and the packing of the items may also be separated into multiple packages.

In this case, even though the picking can be completed through one operation, the operation needs to be performed several times. Accordingly, there is a desire for a method of improving an efficiency of a picking task to more efficiently ship items in the item storage center.

SUMMARY

Technical Goals

An aspect provides an electronic apparatus for identifying at least one storage place corresponding to pickup item information based on information on or regarding an item group located in each of a plurality of storage places and providing information on the at least one storage place, thereby efficiently picking items, and a method thereof.

Technical goals to be achieved by the present embodiments are not limited to the above-described technical tasks and may further include other technical tasks.

Technical Solutions

According to a first embodiment, there is provided a method of providing information for picking an item in an item storage center, the method including identifying pickup item information, identifying at least one storage place corresponding to the pickup item information among a plurality of storage places in the item storage center based on information on or regarding an item group located at each of the plurality of storage places, and providing information on the identified storage place and the pickup item information to a manager terminal, wherein the item group includes at least one same item corresponding to an item group, and at least a portion of a plurality of item groups including a same item are stored in different storage places in the item storage center.

According to a second embodiment, there is also provided an electronic apparatus for providing item picking information of an item storage center, the apparatus including a memory comprising instructions and a processor. The processor is connected to the memory and configured to identify pickup item information, identify at least one storage place corresponding to the pickup item information among a plurality of storage places in the item storage center based on information on or regarding an item group located at each of the plurality of storage places, and provide information on the identified storage place and the pickup item information to a manager terminal. The item group includes at least one same item corresponding to an item group. At least a portion of a plurality of item groups including a same item are stored in different storage places in the item storage center.

According to a third embodiment, there is also provided a method of providing item picking information by a manager terminal, the method including identifying information on or regarding a picking event, providing storage place information corresponding to the picking event, identifying identification information of the storage place, and providing item information corresponding to the picking event related to the storage place, wherein the provided item information includes information on an item included in different item groups located in the storage place.

Details of other embodiments are included in the detailed description and the accompanying drawings.

Effects

According to example embodiments, an electronic apparatus and a method of the same may provide information on or regarding a storage place corresponding to a picking event of an item storage center in which items are arranged based on an item group, thereby improving an efficiency of a picking task through a minimization of picking operation.

Further, according to example embodiments, an electronic apparatus and a method of the same may acquire information on or regarding a quantity of an item corresponding to pickup item information, identify a storage place in which the quantity of the item or more is located based on the acquired information, and provide information on the identified storage place, thereby providing information on a more suitable storage place for each pickup item information and improving an efficiency of a picking task.

BRIEF DESCRIPTION OF THE DRAWINGS

FIG. 7 is a diagram illustrating an example of information provided to a manager terminal in association with an item picking information providing method according to an example embodiment.

FIG. 8 is a flowchart illustrating an item picking information providing method in view of a manager terminal according to an example embodiment.

DETAILED DESCRIPTION

Terms used in embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element.

Throughout the specification, the expression "at least one of A, B, and C" may include the following meanings: A alone; B alone; C alone; both A and B together; both A and C together; both B and C together; and all three of A, B, and C together.

The term "terminal" mentioned below may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, embodiments of the present disclosure will be described in detail with reference to the drawings so that those skilled in the art can easily carry out the present disclosure. However, the present disclosure may be implemented in various different forms but it is not limited to the exemplary embodiments described herein.

Hereinafter, example embodiments of the present disclosure will be described with reference to the drawings.

Figure 1:
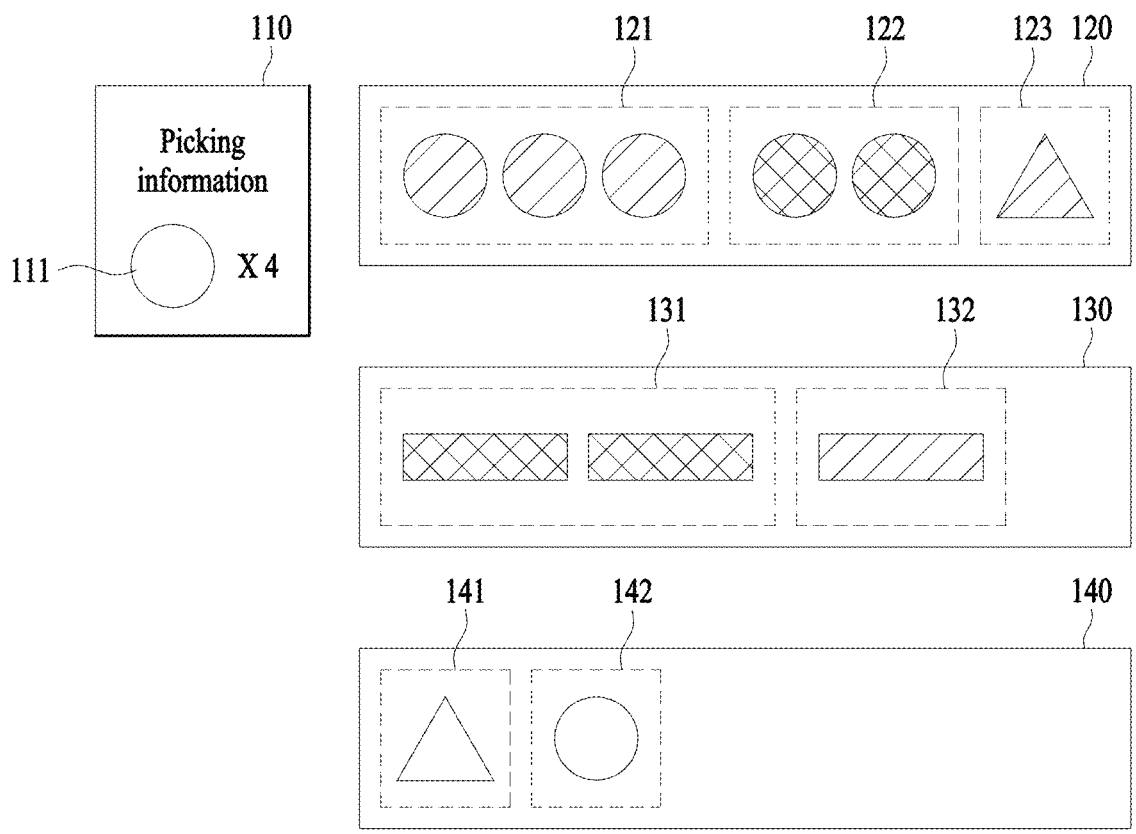
FIG. 1 is a diagram illustrating an item picking information providing method according to an example embodiment.

FIG. 1 is a diagram illustrating an item picking information providing method according to an example embodiment. Hereinafter, for ease of description, FIG. 1 illustrates different items as different figures and illustrates different attributes using different patterns filling insides of the figures.

Various items (or products, goods) for delivery may be stored in an item storage center (or fulfillment center, distribution warehouse). The item storage center may include a plurality of storage places. For example, referring to FIG. 1, the item storage center may include a first storage place 120, a second storage place 130, and a third storage place 140.

At least one item group may be placed in each of the plurality of storage places. An item group may include at least one item, and may be determined based an item and at least a portion of attributes of the item.

In the example embodiment, the item and at least a portion of the attributes of the item may differ for each item group. For example, same items having different attributes may be included in different item groups. Different items having same attributes may be included in different item groups. Different items having different attributes may be included in different item groups.

As an example, a first item and a second item different from each other may be included in different item groups. Referring to FIG. 1, a first item may be included in a first item group 121 (or a second item group 122), and a second item may be included in a third item group 123. As another example, the first item having a first attribute may be included in the first item group 121, and the first item having a second attribute may be included in the second item group 122.

The attribute of the item may be designated for each item in advance, and may be related to at least one of a manufactured date, a shelf life, a warehousing date, and a display date. However, it is merely an example, and the attribute may be designated based on various information such as a distribution period, a raw material, or a manufactured company. An attribute of the item group may be determined based on the attribute of the item included in the item group. For example, the attribute of the item group may correspond to the attribute of the item. In some cases, the item group may include a plurality of items. In such cases, the attribute of the item group may include a quantity of the items included in the item group.

In the example embodiment, the item group may be unique information allocated in units of at least one item placed in the item storage center based on the random stow method being used. The item group may be a display unit for a storage place in the item storage center, and may be designated when the item is received or displayed. Information on or regarding the item group may be stored in an electronic apparatus for providing item picking information and used for an operation of the electronic apparatus for item shipping as described below.

In the example embodiment, even if items are the same item, the items may be placed in one storage place while belonging to different item groups. As an example, in the first storage place 120 of FIG. 1, a portion of the plurality of first items may be included in the first item group 121, and another portion may be included in the second item group 122. As another example, in the second storage place 130 of FIG. 1, a portion of a plurality of third items may be included in a fourth item group 131 and another portion may be included in a fifth item group 132.

In the example embodiment, an item group including different items may be placed in one storage place. For example, the third item group 123 including the second item distinguished from the first item may be placed in the first storage place 120. A sixth item group 141 including a fourth item and a seventh item group 142 including the first item may be placed in the third storage place 140.

An item corresponding to pickup item information 110 and stored in the item storage center may be picked by a manager and delivered to a customer who ordered the item through a shipping task (or packing and shipping task). For example, referring to FIG. 1, the pickup item information 110 may include information requesting four first items 111 to be picked. In this example, an electronic apparatus according to the example embodiment may identify a storage place satisfying the pickup item information 110 among a plurality of storage places and provide information on or regarding the identified storage place to a manager terminal, so that the item is picked. The picked item may be delivered to the customer through a packing process. In an example, a process of delivering the item shipped from the item storage center may go through a process of picking an item in the item storage place, a rebinning process for classifying the picked item to correspond to delivery information, and a packing process of packing the picked item or rebinned item corresponding to order information. Through such processes, the item stored in the item storage center may be selected based on the order information and effectively packed for delivery.

In the example embodiment, the pickup item information 110 may include information indicating an item (e.g., a name of the item) and information on a quantity of the item requested to be picked. The electronic apparatus may identify a storage place corresponding to the pickup item information 110 among a plurality of storage places based on information on respective item groups placed in the plurality of storage places.

In an example, when the pickup item information 110 includes information on the four first items 111 as illustrated, the electronic apparatus may identify at least one storage place including the first item 111 among the plurality of storage places based on information on the item group. The electronic apparatus may identify a storage place in which the first item 111 of a quantity satisfying the pickup item information 110 among the identified at least one storage place. Here, the quantity satisfying the pickup item information 110 may include, for example, a quantity of the item included in the pickup item information 110 or more.

The electronic apparatus according to the example embodiment may identify an item placed in each of the plurality of storage places using information on the item group associated with each of the plurality of storage places and identify a storage place corresponding to the pickup item information 110, so that item picking is efficiently conducted in the item storage center.

More specifically, regarding a situation as illustrated in FIG. 1, an electronic apparatus different from that of the present embodiment may conduct a management in units of an item group. Thus, for the picking corresponding to the pickup item information 110, information requesting the first item group 121 to be picked from the first storage place 120 among the item groups and requesting the seventh item group 142 to be picked from the third storage place 140 may be generated. Alternatively, information requesting the entire first item group 121 to be picked for a first manager terminal and information requesting the seventh item group 142 to be picked for a second manager terminal may be generated.

The electronic apparatus according to the present embodiment may perform an item placement in the item storage center in units of the item group and perform item picking in units of a storage place, thereby maximizing an efficiency of the picking. Hereinafter, the electronic device according to the present embodiment in which picking is performed in units of a storage place and an operation thereof will be described in detail.

Figure 2:
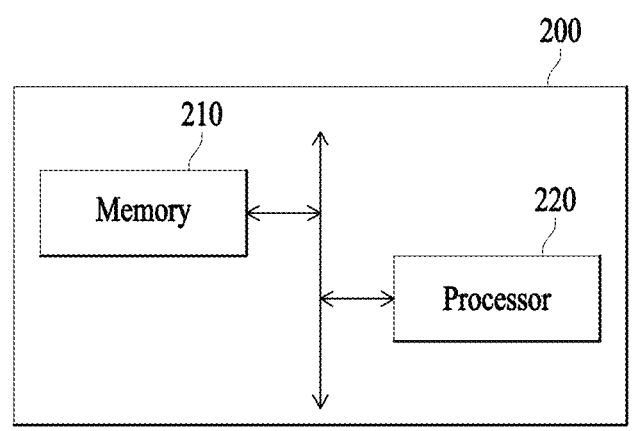
FIG. 2 is a functional block diagram of an electronic apparatus according to an example embodiment.

FIG. 2 is a functional block diagram of an electronic apparatus according to an example embodiment. FIG. 2 illustrates only components related to the present embodiment. However, it is apparent to those skilled in the art that other general-purpose components may be further included in addition to the components illustrated in FIG. 2.

Referring to FIG. 2, an electronic apparatus 200 may include a memory 210 and a processor 220. Each element illustrated in FIG. 2 may be a unit that processes at least one function or operation and may be implemented through hardware, software, or a combination of hardware and software.

Depending on an embodiment, the electronic apparatus 200 of FIG. 2 may be implemented as a server. However, the present specification is not limited by an implementation of the electronic apparatus 200.

The memory 210 may store a variety of data associated with the electronic apparatus 200. As an example, the memory 210 may store at least one instruction for an operation of the electronic apparatus 200. In this example, the processor 220 may perform various operations based on the instruction stored in the memory 210. As an example, the memory 210 may store information on an item group placed in each of a plurality of storage places in the item storage center. The information on the item group may include, for example, information on a storage space corresponding to the item group, information on an item corresponding to the item group, and information on an attribute of the item corresponding to the item group.

Each item group may include at least one same item corresponding to the corresponding item group. For example, a first item group may include at least one first item, and a second item group may include at least one item. The item group may be classified by attribute of the item. For example, the first item group may include at least one first item having a first attribute, and the second item group may include at least one first item having a second attribute. An attribute of an item may include at least one of, for example, a manufactured date, a shelf life, a warehousing date, and a display date. However, it is merely an example, and the attribute of the item may include a quantity of the item included in a corresponding item group.

In the example embodiment, at least a portion of a plurality of item groups including the same item may be stored in different storage places in the item storage center. In some cases, the first item group and the second item group including the same item may be stored in a same storage place. In such cases, respective items corresponding to the first item group and the second item group may have different attributes.

In the example embodiment, a placement of an item for each of the plurality of storage places in the item storage center may be performed for each item group. The item group may be designated in advance. Also, in response to the item group being designated, the item group may be placed in one of the plurality of storage places. The placement of the item group may be based on a random stow method. Since the random stow method is easy for those skilled in the art, a detailed description will be omitted. As such, based on the placement performed using the random stow method, the information on the item group may be stored in the memory 210. As will be discussed later, the processor 220 may identify a storage place for item picking based on the information on the item group stored in the memory 210.

Meanwhile, in some cases, the information on the item group may be stored separately in the memory 210 outside, and regarding the storage of the information on the item group, various design changes may be made within a range that is easy for those skilled in the art.

The processor 220 may control an overall operation of the electronic apparatus 200. For example, the processor 220 may control elements of the electronic apparatus 200 based on an instruction stored in the memory 210, thereby controlling an operation of the electronic apparatus 200.

The processor 220 may identify pickup item information. The pickup item information may include information requesting that at least one item placed in a storage place of the item storage center is to be picked. The picked item may be delivered to a customer through packing. In the example embodiment, the pickup item information may include at least one of information on a quantity of the first item to be picked and information indicating the first item (e.g., a name of the first item).

In the example embodiment, the processor 220 may identify sales information of an item (or product) sold through a network. The item may be sold based on e-commerce, and the processor 220 may identify the pickup item information based on the selling. In this case, the pickup item information may include information corresponding to an order requested from at least one customer. However, it is merely an example, and the pickup item information may include information on or regarding a specific item determined to be shipped in various routes (e.g., item picking for providing a sample to a retailer, item picking responding to a request from a specific company).

The processor 220 may identify at least one storage place corresponding to the pickup item information among the plurality of storage places based on the information on or regarding the item group located in each of the plurality of storage places in the item storage center. At least one item group may be located in each of the plurality of storage places.

The processor 220 may identify at least one storage place corresponding to the pickup item information among the plurality of storage places based on the information on or regarding the item group.

In the example embodiment, the pickup item information may include information on or regarding a quantity of the first item to be picked. In this case, the processor 220 may identify a storage place in which the first item is located among the plurality of storage places. Specifically, the processor 220 may identify the storage place in which the first item is located among the plurality of storage places based on the information on the item group placed in each of the plurality of storage places. The processor 220 may further identify, among the identified storage places, any storage place storing at least the quantity of the first item to be picked as at least one storage place corresponding to the pickup item information.

For example, when the quantity of the first item to be picked is four, the processor 220 may identify a storage place in which four or more first items are located among the plurality of storage places, as at least one storage place corresponding to the pickup item information. In some cases, the first items stored in the storage place may be included in different item groups but not be limited thereto.

In the example embodiment, when a storage place in which the quantity of the picked first item or more is located is in plural, the processor 220 may identify a storage place having a shortest distance from the manager terminal among storage places in which the quantity of the picked first item or more is located, as at least one storage place corresponding to the pickup item information. When a number of storage places in which the quantity (e.g., 4) of the first item to be picked or more is located is two, for example, a first storage place and a second storage place among the plurality of storage places, the processor 220 may identify one of the first storage place and the second storage place as at least one storage place corresponding to the pickup item information, the one having the shortest distance from the manager terminal. In this case, a distance between the storage place and the manager terminal may be obtained using various known methods.

In some cases, the identified at least one storage place may include a storage place in which an item group corresponding to an earliest warehousing time in the item storage center is located among a plurality of item groups corresponding to a pickup item. For example, the processor 220 may identify a storage place in which the first item of a quantity corresponding to the pickup item information or more is located based on information on an item group located in each of the plurality of storage places. When the identified storage place is in plural, the processor 220 may identify a storage place including an item group corresponding to the earliest warehousing time in the item storage center as at least one storage place corresponding to the pickup item information.

In the example embodiment, when a storage place in which the quantity of the picked first item or more is located is absent, the processor 220 may identify a first storage place in which a quantity most approximate to the quantity is located. The processor 220 may identify the second storage place that has a shortest distance from the identified first storage place and includes at least one first item.

Specifically, when a storage place in which the first item of a quantity corresponding to the pickup item information (hereinafter, referred to as a "first quantity") or more is located is absent among the plurality of storage places of the item storage center, the processor 220 may identify a storage place in which a quantity most approximate to the first quantity is located, that is, the first storage place. For example, when the pickup item information corresponds to four first items, the processor 220 may identify the first storage place in which the first item of a quantity (e.g., 3) most approximate to 4 is present among the plurality of storage places. The processor 220 may identify the second storage place that has the shortest distance from the identified first storage place and includes at least one first item. In this example, the second storage place may include a separate storage place distinguished from the first storage place.

In some cases, in response to the first storage place being identified, the processor 220 may identify a difference value between the first quantity and a quantity of the first item corresponding to the first storage place based on the pickup item information. The difference value may include a value of a quantity insufficient to satisfy the pickup item information despite the second quantity. For example, when the first quantity corresponding to the pickup item information is five, and when a quantity of the first item placed in the first storage place is three, the processor 220 may identify a difference value between the first quantity and the quantity corresponding to the first storage place, that is, two. In response to the difference value being identified, the processor 220 may identify a storage place located closest to the first storage place among storage places in which the first item of a quantity corresponding to the difference value or more is placed, as the second storage place.

In the example embodiment, when a storage place in which the quantity of the picked first item (hereinafter, referred to as a "first quantity") or more is located is absent, the processor 220 may identify the first storage place having a quantity most approximate to the first quantity. The processor 220 may identify the second storage place including an item group corresponding to an earliest warehousing order among the identified storage places in which the first item is placed. Specifically, when the storage place in which the first quantity or more is located is absent, the processor 220 may identify the first storage place having a quantity most approximate to the first quantity and identify the second storage place including an item group corresponding to an earliest warehousing order among remaining storage places. In this instance, the second storage place may include the first item corresponding to a value greater than or equal to a difference value between the first quantity and a quantity of the first item placed in the first storage place (hereinafter, referred to as a "second quantity"), that is, a value insufficient to satisfy the pickup item information despite the second quantity.

In the example embodiment, when the storage place in which the first quantity or more is located is absent, the processor 220 may identify the first storage place in which a quantity most approximate to the first quantity is located and identify the second storage place in which a remaining quantity is located based on an attribute of the first item. Specifically, based on the attribute of the first item, when the first item is related to an expiration date, the processor 220 may identify the second storage place including an item group corresponding to the earliest warehousing order among remaining storage places other than the first storage place. In some cases, the processor 220 may identify the second storage place that includes the item group that corresponds to the earliest warehousing order and has a remaining quantity (e.g., a difference between the first quantity and the quantity of the first item corresponding to the first storage place) or more among the remaining storage places other than the first storage place.

When the attribute of the first item is irrelevant to the expiration date, the processor 220 may identify a storage place located closest to the first storage place among places including the first item as the second storage place. In some cases, among remaining storage places other than the first storage place, a storage place that has a remaining quantity or more and is located closest to the first storage place may be identified as the second storage place.

In the example embodiment, the processor 220 may identify a plurality of pickup item information associated with the first item. For example, the processor 220 may acquire one or more pickup item information for a predetermined period of time (e.g., 20 seconds) or at intervals of the predetermined period of time. In this case, the processor 220 may identify a plurality of pickup item information associated with the first item among the acquired one or more pickup item information. In response to the plurality of pickup item information being identified, the processor 220 may generate integrated pickup item information by integrating the plurality of pickup item information.

Here, the integrated pickup item information may include information on the first item and a quantity of the first item required by the plurality of pickup item information. For example, the integrated pickup item information may include information on a total required quantity of the first item and a name of the first item corresponding to the plurality of pickup item information. However, it is merely an example, and the integrated pickup item information may include information in which a quantity of the first item is distinguished for each of the plurality of pickup item information.

In this case, the processor 220 may identify at least one storage place corresponding to the integrated pickup item information among the plurality of storage places. For example, when the integrated pickup item information includes information associated with five first items based on the integration of the first pickup item information and the second pickup item information, the processor 220 may identify at least one storage place in which the five first items are placed among the plurality of storage places.

The processor 220 may provide the identified storage place and the pickup item information to the manager terminal. For example, the processor 220 may provide, to the manager terminal, information on at least one of a location of the identified storage place, a name of the identified storage place, a name of a pickup item, and a quantity of the pickup item. Here, the manager terminal may be a terminal corresponding to each manager in charge of a picking task in the item storage center. A user of the manager terminal may perform the picking task based on information provided to the terminal. An operation of the manager terminal will be further described in detail with reference to FIG. 8.

In the example embodiment, when a plurality of storage places (e.g., the first storage place, the second storage place) is identified in association with the pickup item information, the processor 220 may provide information on the plurality of storage places. For example, the processor 220 may provide, to the manager terminal, information on a location of the first storage place, a quantity of the first item placed in the first storage place, a location of the second storage place, and a quantity of the second item placed in the second storage place.

As such, when the information on the plurality of storage places is provided, the processor 220 may provide information on a picking order such that picking of the first item is performed, starting from a storage place closer to the manager terminal. For example, when the first storage place is located closer to the manager terminal as compared to the second storage place, the processor 220 may provide information for guiding to pick the first item from the first storage place and then pick the second item from the second storage place.

In the example embodiment, when a plurality of item groups corresponding to a pickup item is located in the identified storage place, the processor 220 may identify information on an item group corresponding to an earliest warehousing time in the item storage center among the plurality of item groups. The processor 220 may provide the identified information to the manager terminal. Specifically, when a plurality of item groups related to a pickup item is located in the storage place corresponding to the pickup item information, the processor 220 may identify an item group corresponding to the earliest warehousing time among the plurality of item groups. For example, when the first item group and the second item group related to the first item are located in the first storage place, the processor 220 may identify one of the first item group and the second item group, the one corresponding to an earliest warehousing time. The processor 220 may provide information on the identified item group corresponding to the earliest warehousing time to the manager terminal such that the item group is picked first.

In the example embodiment, when a storage place is identified based on the integrated pickup item information, the processor 220 may provide, to the manager terminal, information on the identified storage place, the integrated pickup item information, and information on a quantity of the first item for each of the plurality of pickup item information. The information on the identified storage place may include at least one of, for example, a name of the storage place, a location of the storage place, and a route from the manager terminal to the storage place. The integrated pickup item information may include information on at least one of, for example, a name and a quantity of an item corresponding to the integrated pickup item information.

The electronic apparatus according to the present embodiment may provide a guide such that a task is performed based on a storage place when picking an item in the item storage center where items are placed in units of an item group, thereby improving an efficiency of the picking task. For example, the electronic apparatus may identify a storage place in which the picking is to be performed most efficiently based on item group information and provide a guide therefor. Through this, the electronic apparatus may prevent an inefficient situation such as an occurrence of multiple picking operations related to same multiple items and pick items efficiently and quickly.

Figure 3:
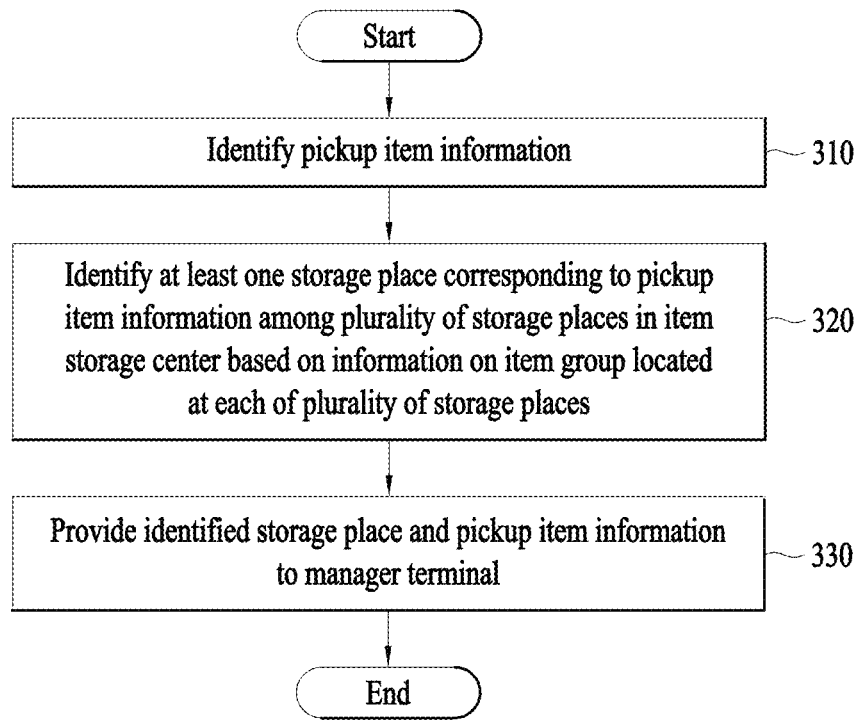
FIG. 3 is a flowchart illustrating an item picking information providing method according to an example embodiment.

FIG. 3 is a flowchart illustrating an item picking information providing method according to an example embodiment. Operations illustrated in FIG. 3 may be performed in different orders or irrespective of an order depending on cases. Since the descriptions made with reference to FIGS. 1 and 2 are also applicable here, repeated description of FIG. 3 will be omitted.

Referring to FIG. 3, in operation 310, an electronic apparatus may identify pickup item information. The pickup item information may be information on or regarding an item required to be picked from a storage place in an item storage center, that is, a pickup item. As an example, the pickup item information may include information on a name of a pickup item which is a target to be picked and a quantity of the pickup item. As another example, information on the pickup item may include information (e.g., a type, a name, a quantity) of an ordered item acquired in response to an order of a customer.

In the example embodiment, the electronic apparatus may identify the pickup item information corresponding to an order of a customer for the pickup item. However, it is merely an example and, in some cases, the electronic apparatus may identify the pickup item information based on an input of a manager of the item storage center.

In operation 320, the electronic apparatus may identify at least one storage place corresponding to the pickup item information among a plurality of storage places in the item storage center based on information on an item group located at each of the plurality of storage places.

The information on the item group may include information indicating an item corresponding to the item group and information on attributes (e.g., a manufactured date, a shelf life, a warehousing date, a display date, a quantity of an item included in the item group) of the item group.

For example, the manufactured date may include a date when the item included in the item group is manufactured, and the shelf life (or expiration date) may include a period of time appropriate for using the item included in the item group. The warehousing date may include a date when the item included in the item group is delivered from a manufactured factory and received in the item storage center. The display date may include a date when the item group is displayed in the storage place. Since the item group is a set of items having attributes corresponding to each other, the manufactured date, the shelf life, and the warehousing date included in one item group may be the same for each item. Since the display of the item is performed in units of the item group in the item storage center, the display date may be the same for each item included in the same item group.

Meanwhile, the attributes of the item group may include information on a quantity of the item included in the item group. Such information may be designated by a manager in response to the item group being formed.

In the example embodiment, the electronic apparatus may identify information on a located item for each of the plurality of storage places based on the information on the item group. The electronic apparatus may identify information on the item corresponding to the pickup item information and information on a quantity of the item. The electronic apparatus may identify at least one storage place in which an item of a quantity corresponding to the pickup item information is located among the plurality of storage places.

In the example embodiment, the electronic apparatus may identify a storage place in which a quantity (hereinafter, a first quantity) of an item (hereinafter, a first item) corresponding to the pickup item information or more is located among the plurality of storage places.

When the storage place in which the first item of the first quantity or more is located is absent, the electronic apparatus may identify a storage place in which the first item of a quantity most approximate to the first quantity is located. For example, when the first quantity is five, and when a storage place including five or more first items is absent among the plurality of storage places, the electronic apparatus may identify a storage place (hereinafter, a first storage place) including the first item of a quantity most approximate to five (or greatest quantity), for example, four first items among the plurality of storage places.

In an example embodiment, the electronic apparatus may identify a second storage place that is closest to the first storage place and includes the first item in response to the first storage place being identified. To satisfy the first quantity, the second storage place may include a storage place including the first item of a quantity greater than a difference value between the first quantity and the quantity of the first item placed in the first storage place.

In another example embodiment, in response to the first storage place being identified, the electronic apparatus may identify a storage place including a first item corresponding to an earliest warehousing date among other storage places (e.g., remaining storage places of the plurality of storage places other than the first storage place) including the first item as the second storage place. To satisfy the first quantity, the second storage place may include a storage place including the first item of a quantity greater than a difference value between the first quantity and the quantity of the first item placed in the first storage place.

In operation 330, the electronic apparatus may provide the identified storage place and the pickup item information to the manager terminal. The electronic apparatus may provide information on, for example, a location of the identified storage place, a name of the storage place, a name of the pickup item, and a quantity of the pickup item to the manager terminal. The manager terminal may be a predetermined terminal including, for example, a mobile phone, a PDA, or a tablet PC.

When a plurality of storage places is identified, the electronic apparatus may provide information on the plurality of storage places to the manager terminal based on locations of the plurality of storage places and the manager terminal. For example, when the identified plurality of storage places includes the first storage place and the second storage place, the electronic apparatus may provide information for guiding a manager to quickly arrive at one of the first storage place and the second storage place, the one closer to a current location of the manager terminal.

Figure 4:
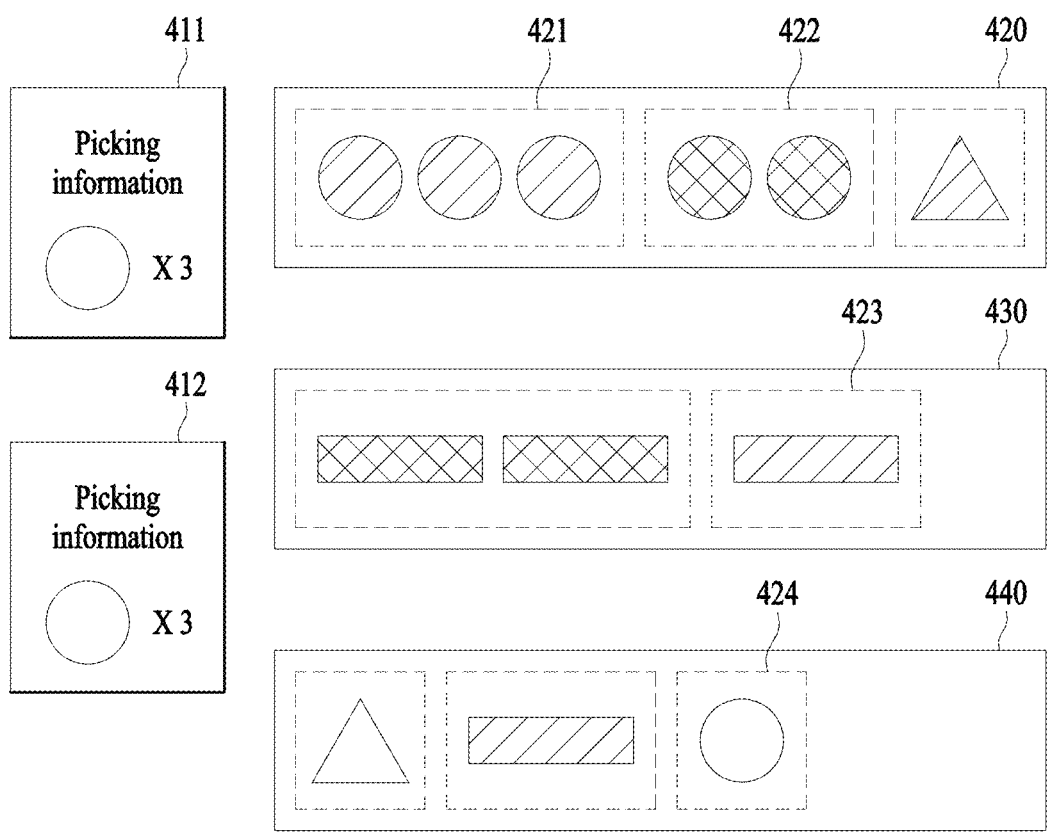
FIG. 4 is a diagram illustrating an example of an item picking information providing method according to an example embodiment.

FIG. 4 is a diagram illustrating an example of an item picking information providing method according to an example embodiment. Specifically, FIG. 4 is a diagram illustrating an example of a method of providing item picking information in a case in which a plurality of pickup item information is identified. Hereinafter, for ease of description, FIG. 4 illustrates different items as different figures and illustrates different attributes using different patterns filling insides of the figures.

In the example embodiment, an electronic apparatus may identify a plurality of pickup item information (e.g., first pickup item information 411, the second pickup item information 412). The plurality of pickup item information may be information associated with a same item among one or more pickup item information acquired for a predetermined period of time. For example, as illustrated, each of the first pickup item information 411 and the second pickup item information 412 may be associated with a first item.

In this case, integrated pickup item information may be generated by integrating the first pickup item information 411 and the second pickup item information 412. An example of integrated item information will be described with reference to FIG. 6.

Meanwhile, an item storage center may include a plurality of storage places (e.g., a first storage place 420, a second storage place 430, and a third storage place 440). Each of the storage places may include at least one item group (e.g., a first item group 421, a second item group 422). An item placement for each of storage places may be performed based on an item group. The item group may include a set of same items having attributes corresponding to each other. For example, as illustrated, the first item group may be a set of three first items having a first attribute, and the second item group may include a set of two second items having a second attribute.

In the example embodiment, a placement of the item group for the storage place may be randomly performed. In response to the placement being randomly performed in units of the item group, the electronic apparatus may identify information on the item group for which the placement is performed and information on the storage place corresponding to the placement. The electronic apparatus may identify information on at least one item placed in the storage place based on the identified information.

Referring to FIG. 4, in the example embodiment, the plurality of pickup item information may include information on six first items. In this case, the electronic apparatus may verify whether a storage place including six or more first items is present among the plurality of storage places (e.g., the first storage place 420, the second storage place 430, and the third storage place 440). As shown in FIG. 4, when the storage place including six or more first items is absent, the electronic apparatus may identify a storage place including a quantity that is most approximate to six, for example, the first storage place 420.

Also, the electronic apparatus may identify another storage place including a remaining quantity or more, for example, the second storage place 430 in which a third item group 423 including one first item is located or the third storage place 440 in which a fourth item group 424 including one first item is located. Here, the remaining quantity may include a difference value of the quantity of the item placed in the first storage place among the quantity corresponding to the pickup item information.

Regarding this, according to an example embodiment, the electronic apparatus may identify one of the second storage place 430 and the third storage place 440, the one located closer to the first storage place 420.

According to another example embodiment, the electronic apparatus may identify one of the second storage place 430 and the third storage place 440, the one located in a shorter distance from the manager terminal. In this case, the manager terminal may include a manager terminal to which information on or regarding the identified storage place is to be provided.

According to still another example embodiment, the electronic apparatus may identify one of the second storage place 430 and the third storage place 440, the one in which a warehousing date of an item group corresponding to the pickup item information is earlier. The warehousing date may be identified based on the attribute of the item group.

In the example embodiment, when at least one storage place corresponding to the pickup item information is identified through the aforementioned operation, the electronic apparatus may transmit information on or regarding the identified at least one storage place to the manager terminal.

Figure 5:
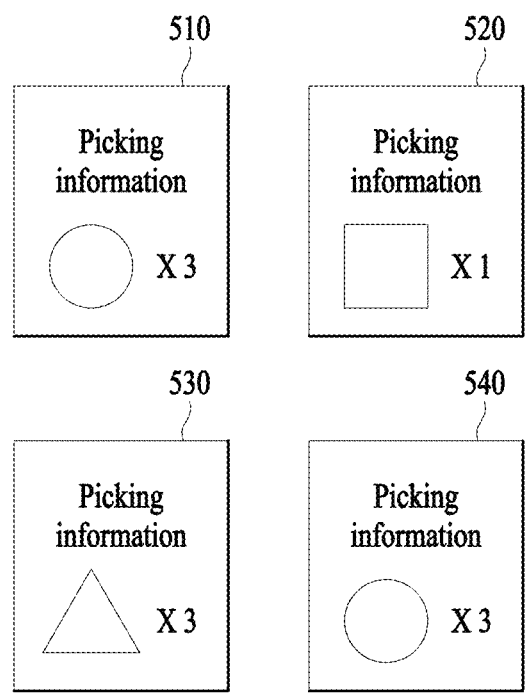
FIG. 5 is a diagram illustrating an operation of identifying pickup item information in an item picking information providing method according to an example embodiment.

FIG. 5 is a diagram illustrating an operation of identifying pickup item information in an item picking information providing method according to an example embodiment. Hereinafter, for ease of description, a same item is represented by a same figure, and different items are represented by different figures.

In the example embodiment, an electronic apparatus may acquire a plurality of pickup item information for a predetermined period of time. For example, referring to FIG. 5, the electronic apparatus may acquire first pickup item information 510, second pickup item information 520, third pickup item information 530, and fourth pickup item information 540 for ten seconds. Meanwhile, the pickup item information may include, for example, information generated for picking an item from a storage place to ship the item in response to an order of a specific customer for the item.

In some cases, the electronic apparatus may acquire the plurality of pickup item information at intervals of a predetermined period (or predetermined time). For example, the electronic apparatus may acquire the plurality of pickup item information at intervals of ten seconds.

In the example embodiment, at least a portion of the plurality of pickup item information may include information received in the electronic apparatus based on transmission from different devices but is not limited thereto, and may also be input by a user of the electronic apparatus, for example.

In the example embodiment, at least a portion of the acquired plurality of pickup item information may be associated with a same item. For example, as illustrated in FIG. 5, the first pickup item information 510 and the fourth pickup item information 540 may include information on a first item.

In this case, the electronic apparatus may integrate the plurality of pickup item information associated with the same item, thereby generating integrated pickup item information. An example of the integrated pickup item information will be described with reference to FIG. 6.

Figure 6:
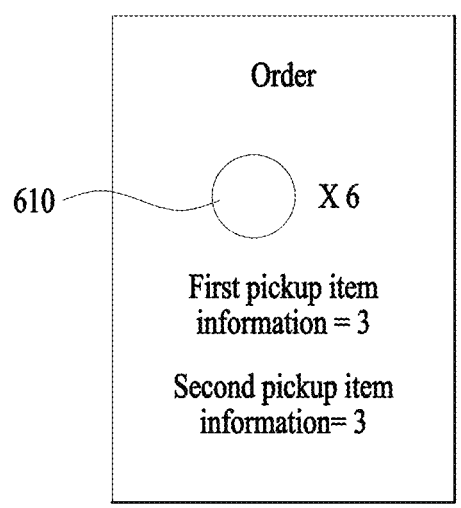
FIG. 6 is a diagram illustrating integrated pickup item information used in an item picking information providing method according to an example embodiment.

FIG. 6 is a diagram illustrating integrated pickup item information used in an item picking information providing method according to an example embodiment.

Referring to FIG. 6, integrated pickup item information may include a plurality of pickup item information. Specifically, the plurality of pickup item information may be associated with a same item among information acquired within a predetermined period of time. For example, as illustrated in FIG. 6, the integrated pickup item information may be associated with a first item 610.

In the example embodiment, the integrated pickup item information may include information on or regarding a quantity of an item corresponding to each of the integrated pickup item information. For example, when the integrated pickup item information of FIG. 6 is generated by integrating first pickup item information and second pickup item information, the integrated pickup item information may include information on a number corresponding to an item quantity of each of the first pickup item information and the second pickup item information, that is, information on "3" as illustrated.

FIG. 7 is a diagram illustrating an example of information provided to a manager terminal in association with an item picking information providing method according to an example embodiment. Specifically, FIG. 7 is a diagram illustrating an example in which at least one storage place corresponding to pickup item information is identified by an electronic apparatus so that the pickup item information and information on or regarding the identified storage place are provided to a manager terminal.

In response to a picking event being generated, a screen representing the picking event may be displayed on the manager terminal. Specifically, referring to reference numeral 701, in response to an occurrence of the picking event, a screen requesting that information on or regarding a tote (or box) for adding an item picked based on the pickup item information is to be input may be displayed on the manager terminal.

Information on or regarding the tote may be input based on a barcode attached to the tote being scanned by the manager terminal. In response to the information on the tote being input, the manager terminal may provide information on a storage place received from the electronic apparatus.

In the example embodiment, referring to reference numeral 702, the manager terminal may display information corresponding to a storage place represented by a specific code, for example, information "21J9241101" on the manager terminal. Also, as illustrated, the manager terminal may display information on or regarding a name and a quantity of an item corresponding to the pickup item information along with the information on the storage place.

Based on the information (e.g., the information on or regarding the storage place, the pickup item information) displayed on the manager terminal, a movement to the storage place may be performed so that the item is picked and added to the tote that is input in the reference numeral 701. In the example embodiment, the picking of the item may be performed by a user of the manager terminal, that is, a manager in charge of a picking task in the item storage center. However, it is merely an example, and the picking of the item may also be performed by an automated system or a robot.

In the example embodiment, in response to the pickup item being picked, the manager terminal may display a screen requesting picking information to be input. For example, as indicated by reference numeral 703, the manager terminal may provide a screen requesting to scan a product barcode included in the item (also referred to as "product" in the reference numeral 703) and input an actually picked item quantity. In this example, the provided screen may show information on a quantity to which the item is requested to be picked, for example, quantity information "5" as indicated by reference numeral 703.

As indicated by reference numeral 704, when picking information (e.g., "5") corresponding to the pickup item information is input, an input button such as "add to tote" may be activated and displayed. When an input to the input button is received based on the activation of the input button, the manager terminal may transmit information indicating that the picking is completed to the electronic apparatus.

In the example embodiment, the electronic apparatus may update information on an item placed in the storage place based on the information received from the manager terminal. For example, the electronic apparatus may identify that five first items are picked from a first storage place in which ten first items are located based on the information received from the manager terminal. In response to the identification, the electronic apparatus may update a quantity of the first item in the first storage place to be five.

Meanwhile, FIG. 7 is merely an example of a screen provided to the manager terminal, and is not limited thereto. Pickup item information and information on a storage place may be provided to the manager terminal in various forms.

FIG. 8 is a flowchart illustrating an item picking information providing method in view of a manager terminal according to an example embodiment. Specifically, FIG. 8 illustrates a flow of operation of a manager terminal relating to a provision of item picking information. Hereinafter, redundant content described above will be omitted.

Referring to FIG. 8, in operation 810, a manager terminal may identify information on a picking event. In the example embodiment, the manager terminal may identify the information on the picking event in response to the information on the picking event being received from an electronic apparatus. The picking event may include, for example, an event in which a task of picking an item from a storage place for item shipping occurs. The information on the picking event may include pickup item information and information on a storage place corresponding to the pickup item information.

In operation 820, the manager terminal may provide storage place information corresponding to the picking event. Specifically, the manager terminal may display the storage place information indicating a storage place based on the information on the picking event. In response to the storage place information being displayed, a manager who is a user of the manager terminal may move to the storage place.

In operation 830, the manager terminal may identify identification information of the storage place. In the example embodiment, the manager terminal may be moved to a location corresponding to the storage place based on the storage place information displayed in association with operation 820. The manager terminal may identify the identification information on the storage place based on the movement to the location corresponding to the storage place.

Here, the identification information on the storage place may include unique information previously assigned for identifying the storage place. For example, the identification information may be provided in a form of a barcode on at least a portion of the storage place. The manager terminal may identify the identification information on the storage place based on an identification of the provided identification information.

In operation 840, the manager terminal may provide item information corresponding to the picking event. Specifically, the manager terminal may provide item information corresponding to the picking event related to the storage place. In the example embodiment, in response to the identification information on the storage place being identified, the manager terminal may display item information of an item to be picked from the storage place, for example, information on a name of the item and a quantity of the item.

In this case, the manager may pick the item based on the displayed information and proceed to ship the item. However, it is merely an example, and the item picking corresponding to the displayed information may be performed by an automated system or a robot.

In some cases, the manager terminal may receive an input indicating completion of the picking event. In response to the input being received, the manager terminal may transmit the item information corresponding to the picking event to an electronic apparatus.

According to the present disclosure, an item picking information providing method and an electronic apparatus thereof may provide information on a storage place corresponding to a picking event of an item storage center in which items are arranged based on an item group, thereby improving an efficiency of a picking task through a minimization of picking operation.

Further, an electronic apparatus and a method therefor may acquire information on a quantity of an item corresponding to pickup item information, identify a storage place in which the quantity of the item or more is located based on the acquired information, and provide information on the identified storage place, thereby providing information on a more suitable storage place for each pickup item information and improving an efficiency of a picking task.

The electronic apparatus described herein may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. These terms may include meaning of a series of routines of software in association with a processor, for example.

The above-described embodiments are merely examples, and other embodiments may be implemented within the scope of the following claims.

What is claimed is:

1. An electronic apparatus for arranging item pickup information based on storage locations and user locations, the electronic apparatus comprising:
 a communication port;
 a memory comprising instructions; and
 a processor,
 wherein the processor is connected to the memory and, based on execution of the instructions, configured to:
 receive, at a first time and via the communication port, pickup item information comprising information on a first quantity of a first item type to be picked up from an item storage center, wherein the item storage center comprises a plurality of storage places, and wherein each storage place of the plurality of storage places is configured to store, at a respective storage location, one or more item groups, and wherein the one or more item groups are stored in the plurality of storage places based on a random stow-based arranging method;
 receiving, during a predetermined time range after the first time, one or more pickup item information, each comprising information on a quantity of the first item type to be picked up from the item storage center;
 generating, by combining the first pickup item information and the one or more pickup item information, integrated pickup item information comprising information on a first quantity of the first item type to be picked up from the item storage center;
 receive, via the communication port and corresponding to the first item type, information of at least one storage place in which the first item type is located among the plurality of storage places at the item storage center;
 determine, based on the first quantity of the first item type in the pickup item information and based on respective quantities of the first item type at the plurality of storage places, whether any respective quantity of the first item type is equal or greater than the first quantity;

determine, based on a determination that no respective quantity is equal or greater than the first quantity, a first storage place, at a first location, which comprises a second quantity of the first item type, wherein the second quantity is less than the first quantity of the first item type received in the pickup item information;

determine, based on an attribute of the first item type, a second storage place at a second location;

cause the first location and the second location to be displayed on a screen of a manager terminal;

determine, at a first time, a first current location of the manager terminal;

determine, based on the first location, the second location, and the first current location of the manager terminal, that the location of the manager terminal, a storage place, among the first storage location and the second storage location, that is closer to the manager terminal; and automatically cause, on the screen of the manager terminal and based on the first current location of the manager terminal at the first time, display of a route from the location of the manager terminal to the storage place that is closer to the manager terminal;

determine, at a second time, a second current location of the manager terminal; and based on the second current location of the manager terminal corresponding to the storage place that is closer to the manager terminal, automatically cause, on the screen of the manager terminal, display of the quantity of the first item type to be picked up at the storage place that is closer to the manager terminal;

receive, from the manager terminal, (i) scanning information on barcodes related to the storage place that is closer to the manager terminal and (ii) information on a quantity of the first item type actually picked up; and update information on the first item type placed in the storage place that is closer to the manager terminal based on the scanning information and the information on the quantity of the first item type actually picked up.

2. A method of arranging item pickup information display based on storage locations and user locations, the method comprising:

receiving, at a first time and via a communication port of an electronic apparatus, first pickup item information comprising information on a fourth quantity of a first item type to be picked up from an item storage center, wherein the item storage center comprises a plurality of storage places, and wherein each storage place of the plurality of storage places is configured to store, at a respective storage location, one or more item groups, and wherein the one or more item groups are stored in the plurality of storage places based on a random stow-based arranging method;

receiving, during a predetermined time range after the first time, one or more pickup item information, each comprising information on a quantity of the first item type to be picked up from the item storage center;

generating, by combining the first pickup item information and the one or more pickup item information, integrated pickup item information comprising information on a first quantity of the first item type to be picked up from the item storage center;

receiving, via the communication port of the electronic apparatus and corresponding to the first item type, information of at least one storage place in which the first item type is located among the plurality of storage places at the item storage center;

determining, based on the first quantity of the first item type in the pickup item information and based on respective quantities of the first item type at the plurality of storage places, whether any respective quantity of the first item type is equal or greater than the first quantity;

determining, based on a determination that no respective quantity is equal or greater than the first quantity, a first storage place, at a first location, which comprises a second quantity of the first item type, wherein the second quantity is less than the first quantity of the first item type received in the pickup item information;

determining, based on an attribute of the first item type, a second storage place at a second location;

causing the first location and the second location to be displayed on a screen of a manager terminal;

determining, at a first time, a first current location of the manager terminal;

determining, based on the first location, the second location, and the first current location of the manager terminal, a storage place, among the first storage location and the second storage location, that is closer to the manager terminal; and automatically causing, on the screen of the manager terminal and based on the first current location of the manager terminal at the -first time, display of a route from the location of the manager terminal to the storage place that is closer to the manager terminal;

determining, at a second time, a second current location of the manager terminal; and based on the second current location of the manager terminal corresponding to the storage place that is closer to the manager terminal, automatically causing, on the screen of the manager terminal, display of the quantity of the first item type to be picked up at the storage place that is closer to the manager terminal;

receiving, from the manager terminal, (i) scanning information on barcodes related to the storage place that is closer to the manager terminal and (ii) information on a quantity of the first item type actually picked up; and updating information on the first item type placed in the storage place that is closer to the manager terminal based on the scanning information and the information on the quantity of the first item type actually picked up.

3. The method of claim 2, further comprising:

receiving, via the communication port, second pickup item information comprising information on a fourth quantity of a second item type;

receiving a location of the manager terminal in the item storage center;

determining, based on the fourth quantity of the second item type, a second subset of the storage places having at least the fourth quantity of the second item type and corresponding locations of the storage places; and determining, based on the location of the manager terminal and based on the locations of the storage places of the second subset, a third storage location having a minimum distance between the location of the manager terminal and the storage places of the second subset.

4. The method of claim 2, wherein the first storage place comprises a storage place comprising an item group corresponding to an earliest warehousing time in the item storage center among the one or more item groups corresponding to a pickup item.

5. The method of claim 2, further comprising:
providing, to the manager terminal, information regarding an item group corresponding to an earliest warehousing time in the item storage center among the one or more item groups.

6. The method of claim 2, wherein items corresponding to an item group are a same item, and at least one of manufactured dates, shelf lives, warehousing dates, or displayed dates correspond to each other.

7. The method of claim 2, wherein the information regarding the item group comprises information regarding a quantity of an item included in the item group and a name of the item.

8. The method of claim 2, further comprises:
acquiring one or more information associated with a pickup of each of a plurality of items for a second predetermined period of time; and
identifying a plurality of information associated with the pickup of the first item type among the acquired one or more information.

9. The method of claim 2, wherein items of different types are grouped into different item groups.

10. The method of claim 2, wherein items of a same type are grouped into the one or more item groups.

11. The method of claim 2,
wherein at least two or more of the one or more item groups comprise items of the same type, and
wherein the at least two or more of the one or more item groups having the same item type are located at separate storage places in the item storage center.

12. The method of claim 2, wherein, the determining of the second storage place comprises:
when the attribute of the first item type is related to an expiration date, determining, among one or more storage places in which at least a third quantity of the first item type is located, a storage place including an item group corresponding to an earliest warehousing order to be the second storage place, wherein the third quantity corresponds to a difference between the first quantity and the second quantity; and
when the attribute of the first item type is not related to the expiration date, determining, among one or more storage places in which at least the third quantity of the first item type is located, a storage place which is located closest to the first storage place to be the second storage place.

* * * * *